US010178205B2

(12) United States Patent
Vyas et al.

(10) Patent No.: US 10,178,205 B2
(45) Date of Patent: Jan. 8, 2019

(54) WIRELESS DEVICE OF A WIRELESS LOCAL AREA NETWORK COMMUNICATING WITH A DEVICE OF AN EXTERNAL NETWORK ON A TCP SESSION BEFORE AND AFTER DISASSOCIATION FROM THE WIRELESS LOCAL AREA NETWORK

(71) Applicant: GainSpan Corporation, San Jose, CA (US)

(72) Inventors: Pankaj Vyas, Bangalore (IN); Vishal Batra, Bangalore (IN); Burhanuddin Lohawala, Bangalore (IN)

(73) Assignee: GAINSPAN CORPORATION, San Jose, CA (US)

( * ) Notice: Subject to any disclaimer, the term of this patent is extended or adjusted under 35 U.S.C. 154(b) by 73 days.

(21) Appl. No.: 15/262,022

(22) Filed: Sep. 12, 2016

(65) Prior Publication Data

US 2017/0346931 A1 Nov. 30, 2017

(30) Foreign Application Priority Data

May 31, 2016 (IN) .............................. 201641018662

(51) Int. Cl.
*H04L 29/06* (2006.01)
*H04L 29/12* (2006.01)
(Continued)

(52) U.S. Cl.
CPC .......... *H04L 69/169* (2013.01); *H04L 5/0055* (2013.01); *H04L 61/255* (2013.01);
(Continued)

(58) Field of Classification Search
CPC ..... H04L 69/169; H04L 69/22; H04L 5/0055; H04L 61/2514; H04L 61/255;
(Continued)

(56) References Cited

U.S. PATENT DOCUMENTS 7,406,061 B2 7/2008 Harsch
8,503,300 B2 8/2013 Patel et al.
(Continued)

FOREIGN PATENT DOCUMENTS

EP 1278348 A1 1/2003

OTHER PUBLICATIONS

Seamless Roaming with MR Access Points—Cisco Meraki, https://documentation.meraki.com/MR/WiFi_Basics_and_Best_Practices/Seamless_Roaming_with_MR_Access_Points, Downloaded circa May 6, 2016, pp. 1-1.

(Continued)

*Primary Examiner* — Jianye Wu
(74) *Attorney, Agent, or Firm* — Pearl Cohen Zedek Latzer Baratz LLP

(57) ABSTRACT

A wireless station associates with an access point to join a wireless local area network (WLAN). The access point is part of the WLAN and operates as a switching device between wireless stations of the WLAN. The wireless station forms a TCP session via the access point with an external device which is external to the WLAN. The wireless station exchanges (i.e., transmits and/or receives) a first sequence of packets on the TCP session. The wireless station receives a frame from the access point, the frame indicating that the wireless station has been disassociated after having associated earlier with the access point. The wireless station re-associates with the access point. The access point then communicates with the external device on the TCP session after re-associating, the communicating involving exchanging a second sequence of packets with the external device after the re-association.

19 Claims, 7 Drawing Sheets

(51) Int. Cl.
*H04L 5/00* (2006.01)
*H04W 76/20* (2018.01)
*H04W 84/12* (2009.01)

(52) U.S. Cl.
CPC .......... *H04L 61/2514* (2013.01); *H04L 69/22* (2013.01); *H04W 76/20* (2018.02); *H04L 61/2517* (2013.01); *H04W 84/12* (2013.01)

(58) Field of Classification Search
CPC .. H04L 61/2517; H04W 76/04; H04W 84/12; H04W 76/20
See application file for complete search history.

(56) References Cited

U.S. PATENT DOCUMENTS

| | | | |
|---|---|---|---|
| 8,601,135 B2 | 12/2013 | Lang et al. | |
| 8,826,413 B2 | 9/2014 | Vijayakumar et al. | |
| 8,891,540 B2 | 11/2014 | Krishna et al. | |
| 9,294,587 B1 | 3/2016 | Passaglia et al. | |
| 2002/0138622 A1 | 9/2002 | Dorenbosch et al. | |
| 2003/0110379 A1* | 6/2003 | Ylonen | H04L 12/4604 713/164 |
| 2009/0252072 A1 | 10/2009 | Lind et al. | |
| 2012/0224484 A1* | 9/2012 | Babiarz | H04L 41/5019 370/235 |
| 2015/0350337 A1 | 12/2015 | Biswas | |
| 2015/0365378 A1* | 12/2015 | Kim | H04L 63/0245 726/13 |

OTHER PUBLICATIONS

Transmission Control Protocol, https://en.wikipedia.org/wiki/Transmission_Control_Protocol, Downloaded circa Jun. 27, 2016, pp. 1-17.

* cited by examiner

WIRELESS DEVICE OF A WIRELESS LOCAL AREA NETWORK COMMUNICATING WITH A DEVICE OF AN EXTERNAL NETWORK ON A TCP SESSION BEFORE AND AFTER DISASSOCIATION FROM THE WIRELESS LOCAL AREA NETWORK

PRIORITY CLAIM

The instant patent application claims priority from co-pending India provisional patent application entitled, "Recreating NAT for TCP session in AP after disconnection", Application Number: 201641018662, Filed: 31 May 2016, naming Pankaj Vyas, Vishal Batra and Burhanuddin Lohawala as the inventors, and is incorporated it its entirety herewith, to the extent not inconsistent with the content of the instant application.

BACKGROUND

Technical Field

Embodiments of the present disclosure relate generally to wireless networks, and more specifically to a wireless device of a Wireless Local Area Network (WLAN) communicating with a device of an external network on a TCP session before and after disassociation from the WLAN.

Related Art

A Wireless Local Area Network (WLAN) generally refers to a network in which wireless end devices communicate with each other over a short distance (typically of the order of tens of meters) using a wireless medium. A WLAN may be designed to contain an access point (AP), and one or more wireless stations (STA, which operate as end devices). The AP is a switch which operates to receive a wireless frame from one STA and forward the received wireless frame to another (target) STA, or to another switch which is in the path to the target STA. STAs of a WLAN can also communicate with other systems/devices (wired or wireless) outside of the WLAN via the AP. Thus, the AP may also operate as a gateway for devices within the WLAN seeking to communicate with device(s) outside the WLAN.

A WLAN may be implemented according to IEEE 802.11 family of standards. A WLAN may be distinguished from other wireless networks, such as cellular networks (e.g., GSM and CDMA), in that in such other wireless networks a pair of wireless devices may communicate directly with each other (with no other devices in the wireless communication path) wirelessly over much greater distances (for example, of the order of kilometers). Further, the mechanism for accessing the shared wireless medium in such other wireless networks may be different from that in WLAN.

A STA needs to first associate with the AP of the WLAN in order to become a part of the WLAN. Association typically entails sending an association request frame to the AP, which in response sends an association response frame to confirm that the STA is thereafter part of the WLAN, thereby allowing the STA to thereafter transmit and receive wireless packets via the AP. Thus, once associated, the STA can communicate with other STAs in the WLAN and/or with devices in other networks (wired or wireless) that are external to the WLAN. As an example, after association with the AP, the STA may communicate with a server in a public network such as the Internet. Such, communication may be according to protocols such as TCP/IP (Transmission Control Protocol/Internet Protocol). TCP protocol is described in RFC 793 published by the Internet Engineering Task Force (IETF). Association may additionally include securing the connection, i.e., exchange of security keys (encryption and decryption keys) to be used for message exchanges between the STA and the AP.

Accordingly, the STA and the server may cooperatively establish a TCP session between the two, and thereafter exchange data packets with each other, as is well known in the relevant arts. As is well known, establishing a TCP session entails setting up appropriate state information (port numbers, etc.) at either end such that TCP packets sent thereafter from and to the corresponding ports are logically identified with the setup TCP session. The TCP session may be terminated (by clearing the state information or other equivalent conventions) once the data exchange is complete (or when the STA and/or the server choose to end the TCP session).

However, it is possible that the AP may disassociate the STA from the WLAN during the time that the TCP session (noted above) is active (i.e., TCP session has not yet been terminated). Disassociation of the STA from the AP implies that the AP will not thereafter forward packets from other devices to the STA, or from the STA to other devices. Such disassociation may occur due to reasons such as, for example, signal interference from other wireless devices causing temporary or intermittent signal loss between the AP and the STA, the STA going to power down state for a long duration, the AP going to power-down state, etc.

Once disassociated, the STA may need to re-associate with the AP before the STA can send/receive data packets (or frames) via the AP from/to other devices, including the server. Several aspects of the present disclosure are directed to STAs which would need to communicate with devices in an external network (such as the server noted above) before and after such disassociation.

BRIEF DESCRIPTION OF THE VIEWS OF DRAWINGS

Example embodiments of the present disclosure will be described with reference to the accompanying drawings briefly described below.

In the drawings, like reference numbers generally indicate identical, functionally similar, and/or structurally similar

DETAILED DESCRIPTION

1. Overview

A wireless station associates with an access point to join a wireless local area network (WLAN). The access point is part of the WLAN and operates as a switching device between wireless stations of the WLAN. The wireless station forms a TCP session via the access point with an external device which is external to the WLAN. The wireless station exchanges (i.e., transmits and/or receives) a first sequence of packets on the TCP session. The wireless station receives a frame from the access point, the frame indicating that the wireless station has been disassociated after having associated earlier with the access point. The wireless station re-associates with the access point. The wireless station then communicates with the external device on the same TCP session after re-associating, the communicating involving exchanging a second sequence of packets with the external device after the re-association.

Several aspects of the invention are described below with reference to examples for illustration. It should be understood that numerous specific details, relationships, and methods are set forth to provide a full understanding of the invention. One skilled in the relevant arts, however, will readily recognize that the invention can be practiced without one or more of the specific details, or with other methods, etc. In other instances, well-known structures or operations are not shown in detail to avoid obscuring the features of the invention.

2. Example Environment

Figure 1:
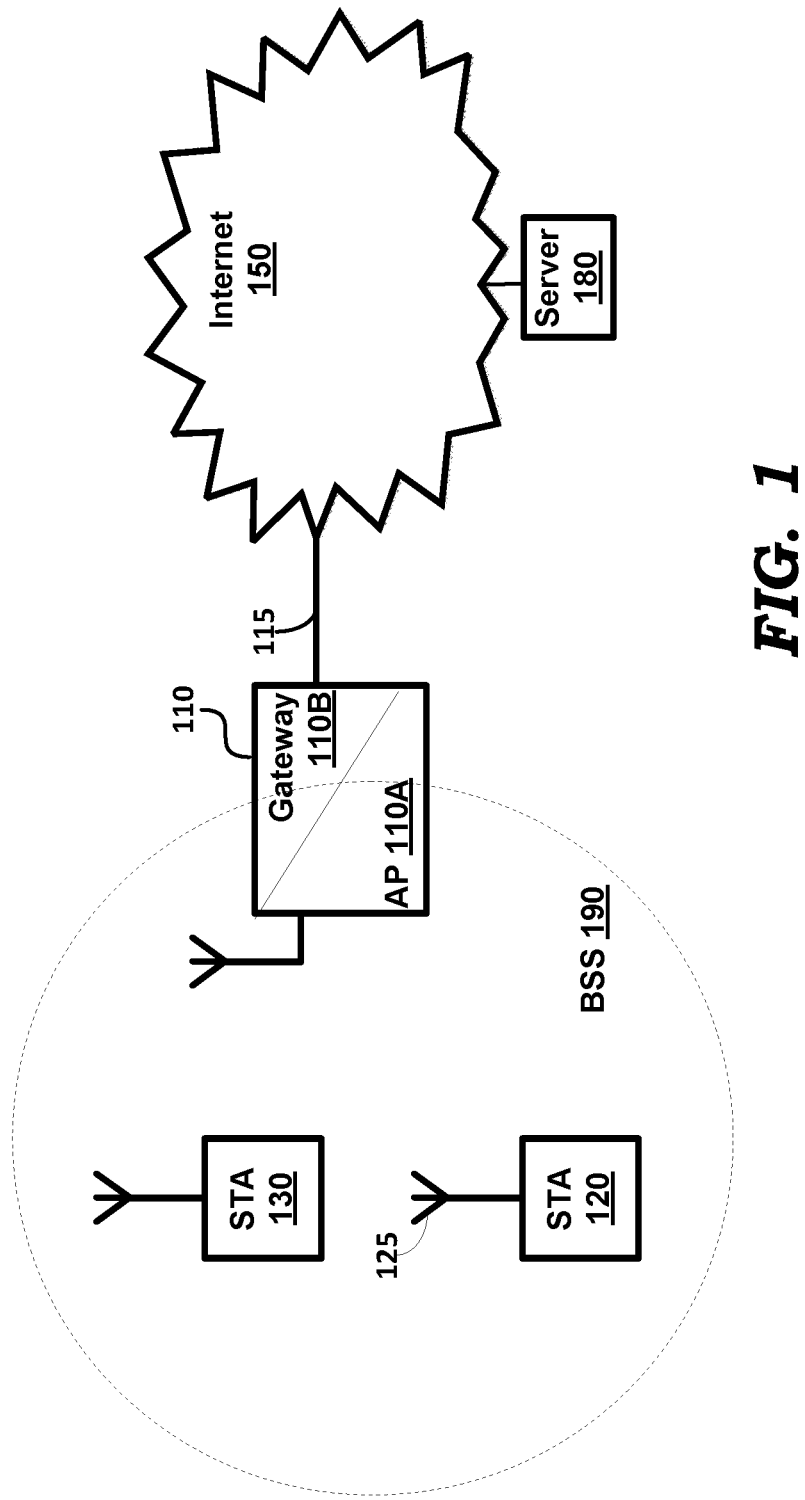
FIG. 1 is a block diagram representing an example environment in which several aspects of the present disclosure can be implemented.

FIG. 1 is a block diagram representing an example environment in which several aspects of the present disclosure can be implemented. The example environment is shown containing only representative devices and systems for illustration. However, real world environments may contain more or fewer systems/devices. FIG. 1 is shown containing device 110, wireless stations (STA) 120 and 130, internet 150, and server 180.

Internet 150 extends the connectivity of STA 120 and STA 130 to various device/systems (e.g., server 180) connected to, or part of, internet 150. Internet 150 is shown connected to device 110 through a wired path 115. Internet 150 may be implemented using protocols such as IP. In general, in IP environments, an IP packet is used as a basic unit of transport, with the source address being set to the IP address assigned to the source system from which the packet originates and the destination address set to the IP address of the destination system to which the packet is to be eventually delivered. The IP packet is encapsulated in the payload of layer-2 packets when being transported across WLANs. In the environment of FIG. 1, internet 150 is implemented according Internet Protocol version 4 (IPv4). As is well known in the relevant arts, IPv4 assigns a 32-bit address (IP address) to each device in the network.

An IP packet is said to be directed to a destination system when the destination IP address of the packet is set to the IP address of the destination system, such that the packet is eventually delivered to the destination system. When the packet contains content such as port numbers, which specifies the destination application, the packet may be said to be directed to such application as well. The destination system may be required to keep the corresponding port numbers available/open, and process the packets with the corresponding destination ports.

BSS (Basic Service Set) 190 represents a Wireless Local Area Network (WLAN) according to IEEE 802.11 family of standards, and is shown containing STA 120, STA 130 and device 110. Device 110 is shown implementing the functions of an AP as well as a gateway, and is implemented as a single integrated unit. The AP portion (referred to herein as AP 110A) of device 110 operates as a switch and enables communication between the STAs of basic service set (BSS) 190, as well as communication with devices in external networks, such as internet 150. AP 110A forwards packets received from either of STA 120 and STA 130 and which are destined for a device in external networks to gateway 110B for further processing and forwarding. Similarly, AP 110A receives from gateway 110B packets transmitted by devices in external networks and destined for one or more of STA 120 and STA 130, and forwards the packets to the corresponding STA(s). AP 110A is assigned an IP address that is in the same subnet as STA 120 and STA 130. To clarify with an example, BSS 190 may represent an IP subnet 192.168.10.X, with AP 110A, STA 120 and STA 130 respectively having local IP addresses 192.168.10.1, 192.168.10.2 and 192.168.10.3.

The gateway portion (referred to herein as gateway 110B) of device 110 acts as a gateway between the devices of BSS 190 and external (public) networks such as internet 150, and performs the necessary protocol conversions (e.g., WLAN to Ethernet and vice-versa at layer 2) to enable communication between STAs 120 and 130 and devices in internet 150. Gateway 110B is assigned a global IP address, i.e., gateway 110B is assigned an IP address that devices in internet 150 can use as the destination IP address for all devices in BSS 190.

STA 120 and STA 130 represent end devices that may execute various user applications, and may communicate with devices (such as server 180) in internet 150 via AP 110A and gateway 110B of device 110. The user applications in one or both of STAs 120 and 130 may generate data values, which may be then be transmitted by the STAs to the other STA or a device/system, such as server 180 in internet 150 (via AP 110A and gateway 110B). For example, each of STAs 120 and 130 may internally contain one or more sensors, which collect corresponding parameter values such as temperature and pressure in process control systems. The STAs may transmit the sensed values in corresponding data frames. STAs 120 and 130 may receive control and command frames from server 180 for purposes such as setting the interval at which to collect sensor readings, the frequency at which to transmit the sensed parameter values, etc. STA 120 is shown containing antenna 125. STA 130 also contains an antenna, which is not shown numbered.

As is well known, due to paucity of IP addresses (because of the 32-bit IP address constraint according to IPv4), STA 120 and STA 130 may not be assigned (static) global IP addresses. Instead, as also noted above, BSS 190 represents a private IP subnet and is assigned another IP address on the external network facing interface (i.e., interface connecting to path 115), such other IP address being either a global IP address or part of another private subnet of another gateway device. Thus, multiple private subnets may be cascaded till the public network (internet 150) is reached. However, in the interest of conciseness and clarity, it is assumed in the following description that the external network facing interface is the global IP address of BSS 190 (or equivalently of gateway 110B, there being no cascading of subnets in FIG. 1).

Devices within BSS 190 (STAs 120 and 130) are assigned local IP addresses. To enable communication (exchange of IP packets) between STAs 120 and 130, and device in internet 150, gateway 110B may perform address translation from a local IP address to the global IP address (i.e., IP address on the external network facing interface connecting to path 115, as noted above) in an outbound packet (packet from STA 120/130 to internet 150), and translation from the global IP address to the corresponding local IP address in inbound packets (from internet 150 to STA 120/130). Accordingly, gateway 110B may internally maintain a Network Address Translation (NAT) table with the corresponding address mappings for each of STA 120 and STA 130, as described in sections below.

As noted above, a STA (e.g., STA 120) of BSS 190 and server 180 may cooperatively setup a TCP session, and thereafter exchange IP packets with each other on that TCP session. Corresponding fields in the IP packets undergo translation in gateway 110B, as noted above. An STA can become disassociated with AP 110A (and thus from BSS 190) while a corresponding TCP session is alive. Disassociation implies that AP 110A will thereafter not forward frames from/to the corresponding (disassociated) STA until that wireless station re-associates with the AP according to the conventions prescribed by the WLAN protocol(s).

Several challenges are presented to a STA operating in the environment of FIG. 1, and the description is continued with respect to the operation of a STA communicating with a device of an external network on a TCP session before and after disassociation from BSS 190.

3. Operations in a Wireless Station

Figure 2:
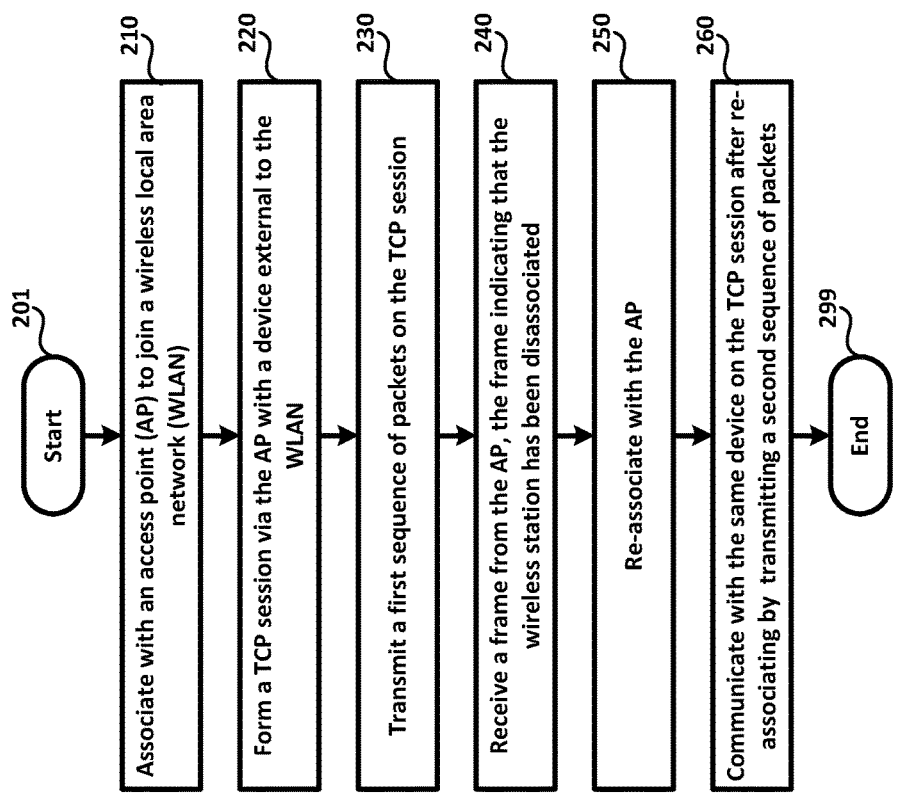
FIG. 2 is a flowchart illustrating operations performed in a STA, in an embodiment of the present disclosure.

FIG. 2 is a flowchart illustrating operations in a STA of a WLAN communicating with a device of an external network on a TCP session before and after disassociation from the WLAN. The flowchart is described with respect to the environment of FIG. 1, and in relation to STA 120, merely for illustration. However, various features described herein can be implemented in other environments (e.g., without NAT by gateway 110B) and using other components as well, as will be apparent to one skilled in the relevant arts by reading the disclosure provided herein. Further, the steps in the flowchart are described in a specific sequence merely for illustration. Alternative embodiments using a different sequence of steps can also be implemented without departing from the scope and spirit of several aspects of the present invention, as will be apparent to one skilled in the relevant arts by reading the disclosure provided herein. The flowchart starts in step 201, in which control passes immediately to step 210.

In step 210, STA 120 associates with AP 110A to join WLAN/BSS 190. The association may entail transmitting an association request frame to AP 110A, and receiving an association response frame from AP 110A, as noted above. The association response frame confirms that the STA 120 is thereafter part of the WLAN, thereby allowing STA 120 to thereafter transmit and receive wireless packets via AP 110A. Control then passes to step 220.

In step 220, STA 120 forms a TCP session via AP 110A (and gateway 110B) with server 180. As is well known in the relevant arts, a TCP session is uniquely identified by the source IP address, destination IP address, and TCP port number sat either end (quadruple). Control then passes to step 230.

In step 230, STA 120 exchanges a first sequence of packets to server 180 on the TCP session. Exchanging implies that STA 120 either receives packets from server 180, or transmits packets to server 180, or both. Control then passes to step 240.

In step 240, STA 120 receives a frame from AP 110A, with the frame indicating that the STA 120 has been disassociated from BSS 190. The received frame may be, for example, a de-authentication frame indicating disassociation due to inactivity. In instances when AP 110A is powered-down and restarted, such received frame may be in response to a packet transmitted by STA 120 to (or via) AP 110A. Control then passes to step 250.

In step 250, STA 120 re-associates with AP 110A. Re-association may again entail transmitting another association request frame to AP 110A (accordingly to WLAN protocols), and receiving another association response frame from AP 110A. Control then passes to step 260.

In step 260, STA 120 communicates with server 180 on the TCP session (established in step 220) after re-associating (step 250) to exchange a second sequence of packets with server 180. Again, exchanging implies that STA 120 either receives packets from server 180, or transmits packets to server 180, or both. The corresponding packets contain the same quadruple values as that noted in step 220 since the packets are transported on the same TCP session. Control then passes to step 299, in which the flowchart ends.

The features described above with respect to FIG. 2 can be implemented in several environments. In one embodiment, the features are implemented where gateway 110B does not implement any NAT function and accordingly packet exchange is continued on the same TCP session without requiring any changes to implementation of gateway 110B. In another embodiment, gateway 110B is implemented with NAT, but the NAT entries are not removed upon disassociation (at layer-2) of STA 120 from BSS 190. In such embodiment also, no changes may be required in the implementation of gateway 110B.

However, environments such as that of FIG. 1 (having NAT) present challenges in allowing STAs to operate as described with respect to the steps of the flowchart of FIG. 4, and the nature of such challenges, and the manner in which they are overcome according to several aspects of the present disclosure, are described next.

4. Network Address Translation

Figure 3:
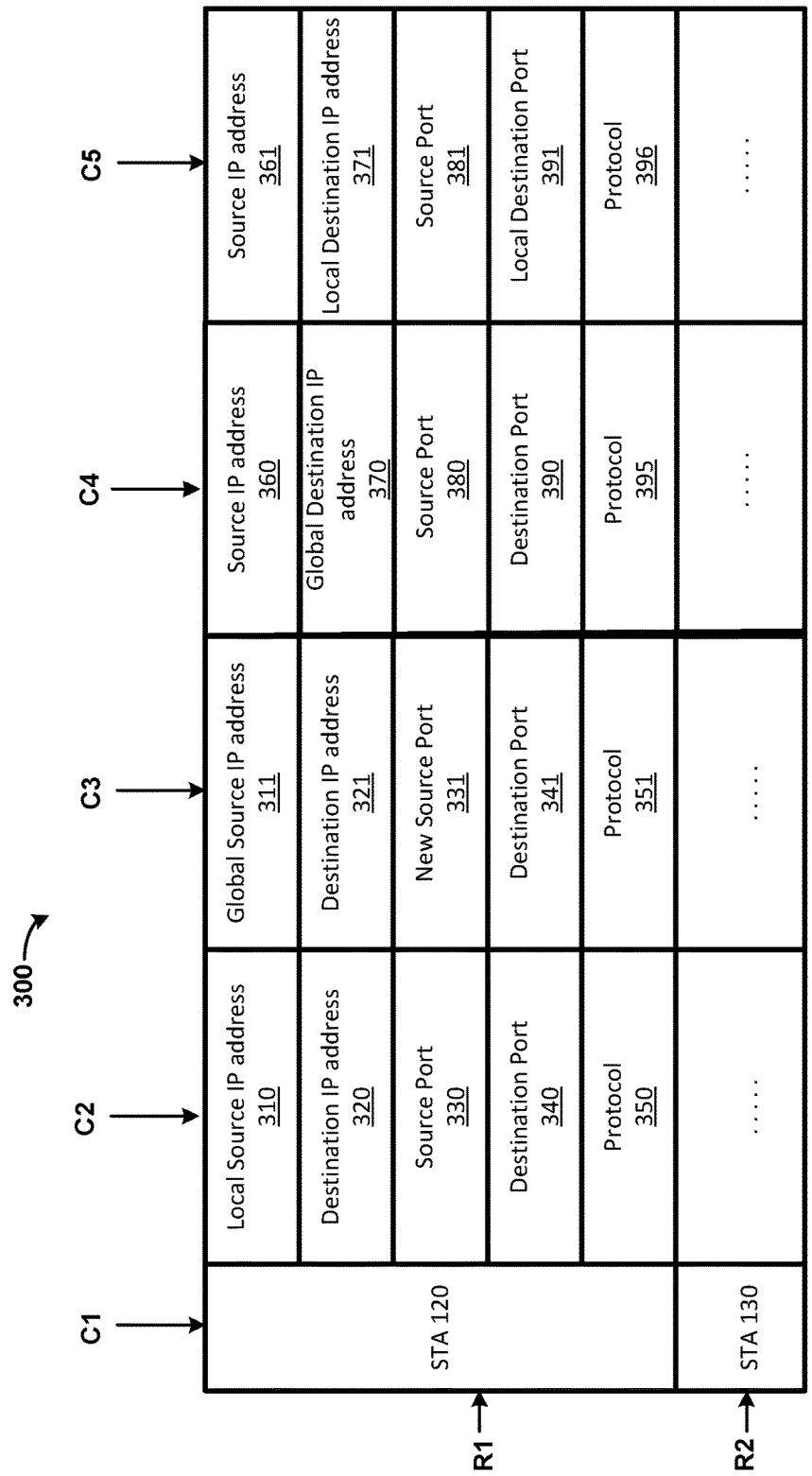
FIG. 3 is a diagram showing partial details of a network address translation table stored in a STA, in an embodiment of the present disclosure.

As noted above, due to the 32-bit IP address constraint imposed by IPv4, gateway 110B needs to perform network address translation (which is described in RFC 2663 published by the IETF), and therefore creates and maintains a NAT table containing entries corresponding to each TCP session involving STA 120 and STA 130. An example NAT table 300 that may be maintained internally in gateway 110B is shown in FIG. 3. In NAT table 300, column C1 specifies the STA to which the corresponding entries in columns C2, C3, C4 and C5 correspond. Only the entries for one session (say session A) between STA 120 and a device (e.g., server 180) on internet 150 are shown in FIG. 3. However, NAT table 300 would contain similar entries for other sessions of STA 120, as well as for sessions of STA 130 as well, although not shown in FIG. 3 in the interest of clarity.

The entries of column C2/row R1 represent values of relevant fields in a TCP header of an IP packet transmitted from STA 120 to a device (e.g., server 180) in internet 150 prior to translation by gateway 110B. The entries of column C3/row R1 represent values of the fields in a TCP header of an IP packet transmitted from STA 120 to a device (e.g., server 180) in internet 150 after translation by gateway 110B. It is noted here that the MAC header of an IP packet transmitted by STA 120 to server 180 would have the MAC address of AP 110A in the MAC destination address field, which would cause AP 110A to receive and process the packet. Thus, AP 110A would forward (via in internal path in device 110) the packet to gateway 110A, which would then forward the packet to the next hop on the way to server 180, and so on, as is well known in the relevant arts.

For an outbound packet from STA 120 (packet from STA 120 towards internet 150), gateway 110B replaces the values in fields 310 and 330 by the values in fields 311 and 331 respectively, while leaving the values in fields 320, 340 and 350 unchanged. Field 310 contains the local source IP address, i.e., the IP address of STA 120 within BSS 190. Field 311 contains the global source IP address, i.e., the IP address of the external facing interface (connected to path 115) of gateway 110B (which for simplicity will be referred to herein as the global IP address of BSS 190). Each of fields 320 and 321 contains the IP address of the device (e.g., server 180) to which the IP packet is destined. Field 330 contains the source port number of the packet. Field 331 contains a new source port number assigned by gateway 110B. Each of fields 340 and 341 contains the destination port address. Each of fields 350 and 351 contains the protocol type (e.g., TCP).

The entries of column C4/row R1 represent values of relevant fields in a TCP header of an IP packet destined to STA 120 from a device (e.g., server 180) in internet 150 prior to translation by gateway 110B. The entries of column C5/row R1 represent values of the fields in a TCP header of an IP packet destined to STA 120 from the device in internet 150 after translation by gateway 110B.

For an inbound packet to STA 120 (packet from internet 150 to STA 120), gateway 110B replaces the values in fields 370 and 390 by the values in fields 371 and 391 respectively, while leaving the values in fields 360, 380 and 395 unchanged. Each of fields 360 and 361 contains the IP address of the device in internet 150 that generated the packet. Field 370 contains the global destination IP address, i.e., the global IP address of BSS 190 (which is the same as the IP address of gateway 110B). Field 371 contains the local IP address of STA 120. Each of fields 380 and 381 contains the source port number. Field 390 contains the destination port number. Field 391 contains the local destination port number assigned by gateway 110B. Each of fields 395 and 396 contains the protocol type (e.g., TCP).

Since only a single global IP address is assigned to BSS 190, and since it is possible that a pair of packets of two TCP sessions from different STAs, can have the same source port number, gateway 110B changes the source port 330 with a (unique) new source port 331 to distinguish between the source of the packets. Thus, for example assuming that there are two active TCP sessions (say, session A and session B), one each between STA 120 and server 180, and STA 130 and server 110, and if the source port numbers of packets of the two sessions are the same, then gateway 110B assigns a new (unique) source port number to packets of each of the two sessions. Hence, when server 180 transmits a packet to STA 120 on session A, the destination port number 390 of the transmitted packet would be the same as the new source port number 331 assigned by gateway 110B to session A, and gateway 110 replaces destination port 390 by local destination port number 391, which would be the same as the source port number 330 for session A.

Similarly, when server 180 transmits a packet to STA 120 on session B, the destination port number of the packet would be the same as the new source port number assigned (not shown) by gateway 110B to session B. In a packet from a device on internet 150 to STA 120 on session B, gateway 110B would replace the destination port number of the packet by the corresponding local destination port, which would be the same as the source port number of the packet generated by STA 120 on session B.

While BSS/WLAN 190 is noted above as being allocated only one global IP address, in another embodiment BSS/WLAN 190 may be allocated more than one global IP address. So long as the number of STAs in BSS 190 is less than the number of available global IP addresses, gateway 110B would have to perform network address translation at least for some STAs. In such instances, new source port numbers may be used only for TCP sessions of those STAs that have not been assigned unique global IP addresses.

Gateway 110B creates NAT table entries for a session in response to a SYN packet sent from STA 120 to server 180 (via AP 110A and gateway 110B), the SYN packet indicating a request to server 180 to setup a TCP session. FIG. 4 shows the various packets that are transmitted for the setup and tear-down of a TCP session, as is well known in the relevant arts. Assuming STA 120 initiates the setting up of the TCP session, STA 120 first transmits the SYN packet (411 in FIG. 4), as noted above. In response to receipt of the SYN packet, server transmits a SYN-ACK packet (412) to STA 120. Receipt of the SYN-ACK packet at gateway 110B confirms to gateway 110B that the NAT table entries created the session are to be retained. In response to receipt of the SYN-ACK packet, STA 120 transmits an acknowledge packet (ACK 413) to server 180. The exchange of the three packets completes the setting up (indicated as 410 in FIG. 4) of a TCP session between STA 120 and server 180.

Figure 4:
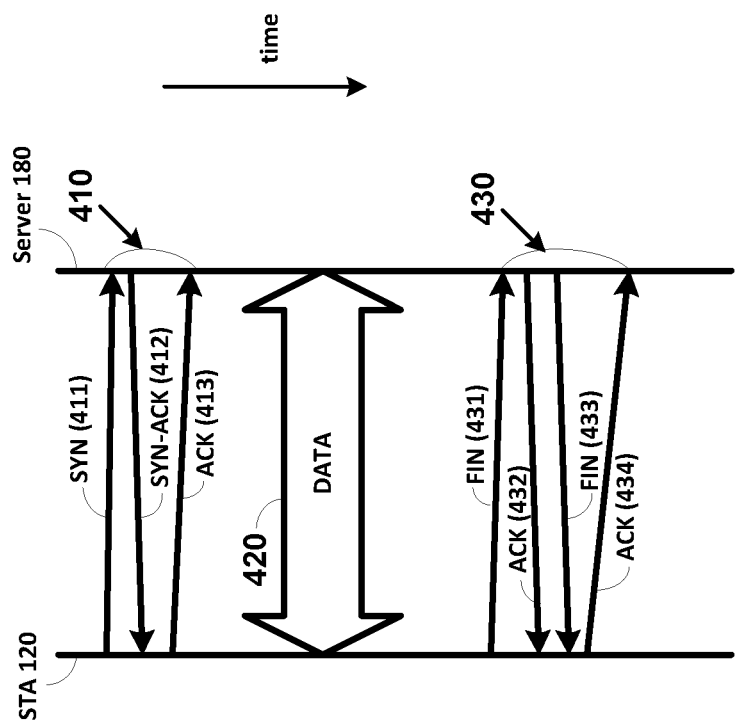
FIG. 4 is a timing diagram illustrating the sequence of exchange of packets between a STA and a server in a TCP session.

Once a TCP connection has been setup, STA 120 and server 180 can exchange TCP/IP packets, as indicated in FIG. 4 by data 420.

Once data exchange is complete, the TCP session may be terminated/torn-down (430). Thus, STA 120 may initiate the tear-down by transmitting a FIN packet (431) to server 180. Server 180 responds by transmitting an ACK packet (432) to STA 120, and then follows it by transmitting a FIN packet (433). In response to receipt of FIN packet (433), STA 120 transmits an ACK packet (434) to server 180, and the TCP session tear-down is complete. Once the TCP session tear-down is complete, gateway 110B deletes the NAT table entries corresponding to the torn-down TCP session.

However, due to reasons such as interference and long periods of inactivity (i.e., no data transmission from STA 120) of STA 120, AP 110A may disassociate STA 120 before a TCP session is torn down. Also, in instances in which AP 110A is switched OFF (or experiences a power failure) and then restarted, AP 110A may not have any record of the wireless stations (such as STA 120) that were associated (and not yet disassociated) with AP 110A before the power down. In such instances, when STA 120 transmits a packet to AP 110A (or via AP 110A to some other device), AP 110A would respond with a de-authenticate packet indicating that STA 120 is disassociated from (or not associated with) AP 110A.

Disassociation implies that AP 110A (in operating consistent with WLAN at layer-2) does not thereafter forward any packets destined to or originating from STA 120. Once disassociated, STA 120 needs to re-associate with AP 110A.

Once thus re-associated, STA 120 may be able to exchange packets with other devices within BSS 190, as well as on new sessions with devices in external networks. However, since gateway 110B has already deleted the NAT table entries corresponding to the earlier torn-down TCP session, STA 120 is not able to resume data exchange on the session, (even though the TCP session itself is alive).

Several aspects of the present disclosure enable STA 120 to resume data exchange on an existing TCP session after disassociation and subsequent re-association with AP 110A, as described next with respect to examples.

5. Use of a SYN Packet

Figure 5:
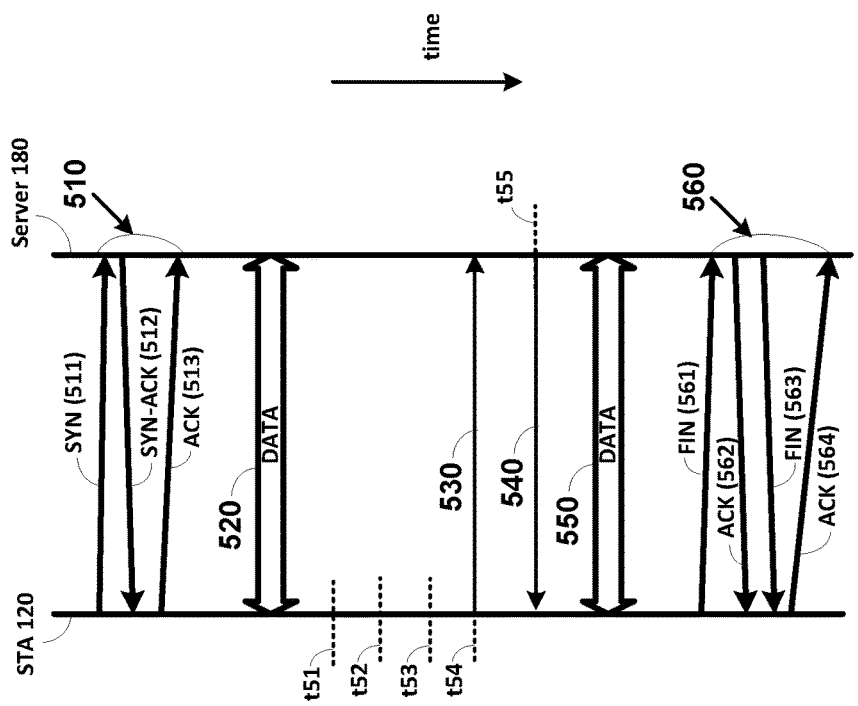
FIG. 5 is a timing diagram illustrating the sequence of exchange of packets between a STA and a server in a TCP session, in which the STA gets disassociated from an access point (AP), and subsequently re-associates with the AP.

In one embodiment, STA 120 transmits a SYN packet (i.e., a TCP/IP packet in which the SYN flag of the TCP header is set to one) that causes gateway 110B to create a NAT table entry again for the interrupted TCP session (the TCP session during which STA 120 was disassociated and subsequently re-associated with AP 110A), as illustrated with respect to various transactions between STA 120 and server 180 shown in FIG. 5.

SYN packet 511, SYN-ACK packet 512 and ACK packet 513 are exchanged between STA 120 and server 180 to set-up (510) a TCP session, in the manner similar to that shown in FIG. 4. STA 120 and server 180 may exchange TCP/IP packets (520) on the created TCP session. It is assumed AP 110A disassociated STA 120 at time instant t51. At, or shortly after t51, gateway 110B deletes the NAT table entries corresponding to the TCP session set-up (510). Subsequently, STA 120 re-associates with AP 110A at time instant t52.

At t53, STA 120 requests AP 110A for the same local IP address (IP address within BSS 190 that was previously allocated to STA 120 before disassociation at t51), and receives the same local IP address. It is noted here that if the requested same local IP address has not been reassigned to any new client, AP 110A assigns the same local IP address to STA 120 as that assigned to STA 120 prior to disassociation at t51. It is likely that AP 110A has not re-assigned the local IP address to some other device, and may therefore assign the IP address once again to STA 120. Although, it is assumed herein that the same local IP address is re-assigned to STA 120 after re-association, such requirement is not mandatory, and a different local IP address can also be assigned to STA 120. However, gateway 110B still requires to assign the same new source port (331) as that assigned prior to disassociation of STA 120, as also noted below.

Figure 6:
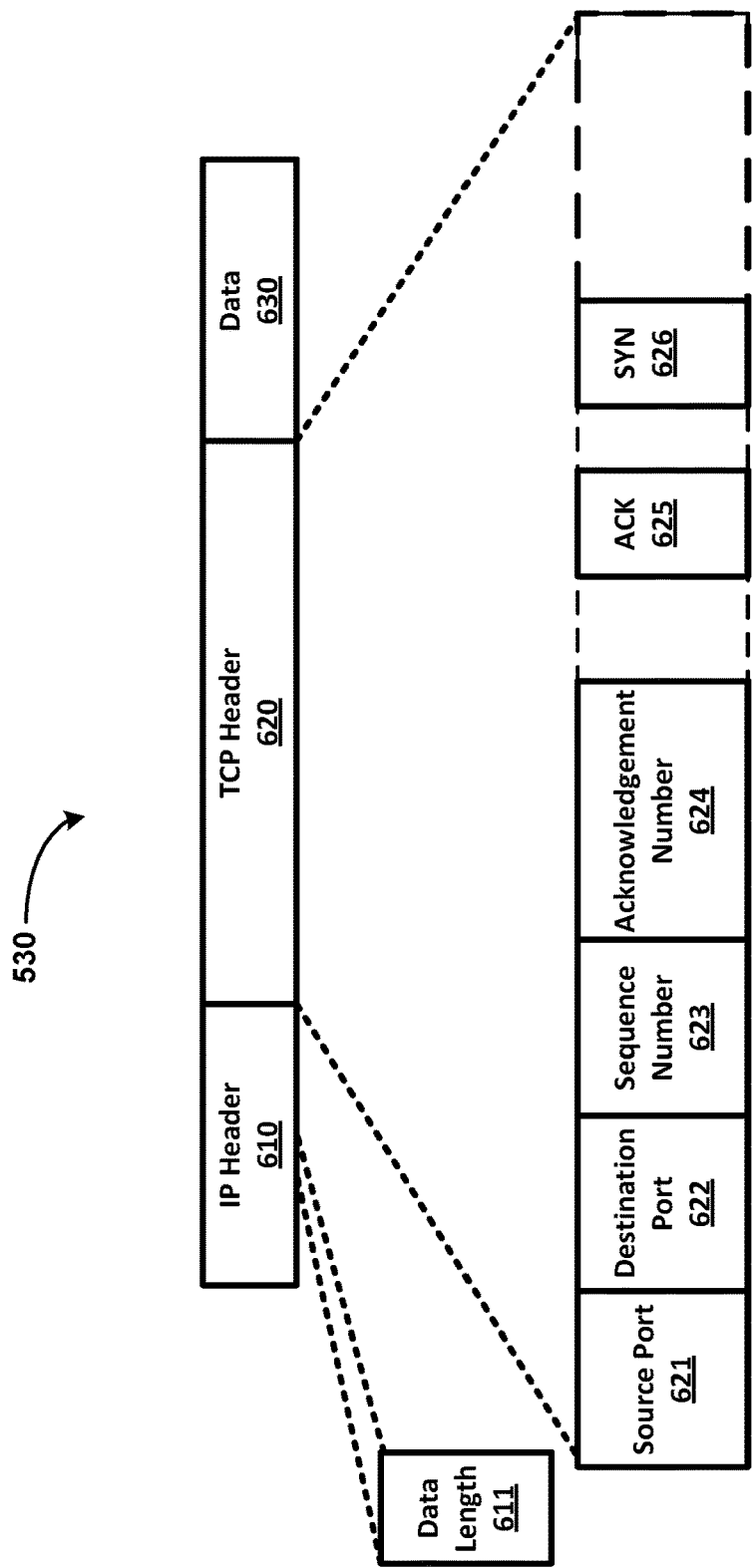
FIG. 6 is a diagram of partial contents of a packet transmitted by a STA to a server, in an embodiment of the present disclosure.

At t54, STA 120 transmits a data packet 530 destined for server 180 with the SYN bit set, and with no data (i.e., data length field equal to zero). Additionally, the sequence number field value in the packet is continued from that in the sequence field of the last packet transmitted, and the ACK bit is a zero. FIG. 6 illustrates packet 530 in greater detail. IP header 610 contains, among other fields, the source IP address (the local IP address of STA 120 in BSS 190), destination IP address (IP address of server 180) and data length field 611. Data field 630 contains no data (or the data is don't care), and the data length field contains a zero indicating that there is no data.

TCP header 620 contains multiple fields as defined by the TCP standard, and only some relevant fields are shown in FIG. 6. Source port field 621 identifies the sending port (in STA 120), and destination port 622 identifies the receiving port (in server 180).

Sequence number field 623 contains the accumulated sequence number of the first data byte of this segment for the current session. To clarify, assuming the sequence number field in the last packet of the TCP session transmitted by STA 120 to server 180 before disassociation was 'N' (bytes), the sequence number field 623 in the first packet on the same TCP session after re-association would be 'N+1'. As is well known in the relevant arts, TCP uses a sequence number to identify each byte of data. The sequence number identifies the order of the bytes sent from each end of a TCP session so that the data can be reconstructed in order, regardless of any packet reordering, or packet loss that may occur during transmission.

The value of acknowledgment number field 624 is 'don't care'. ACK bit/flag 625 is set to zero indicating that the acknowledgment number field 624 is not significant (and which can be ignored by server 180). SYN bit/flag 626 is set to one. The other fields (not shown) in the TCP header are populated with the corresponding appropriate values.

As is well known in the relevant arts, the SYN flag of a TCP header is normally set to one only when the packet is aimed at setting-up of a TCP session, i.e., according to the TCP standard, only the first packet sent from either end (STA 120 and server 180) would have the SYN flag set. Thus, for example, SYN packet 511 of FIG. 5 would contain the SYN flag set to one. Subsequent packets would have the SYN bit/flag set to zero. However, according to an aspect of the present disclosure, the first packet from STA 120 to server 180 on the TCP session following re-association (and before termination of the TCP session) of STA 120 with AP 110A contains the SYN flag set to one.

Gateway 110B, upon receipt of packet 530 (on its way to server 180) inspects the SYN bit, and determines that the SYN bit is set. Consequently, gateway 110B creates a NAT table entry for the session in its NAT table. Thus, gateway (re)creates the entries shown in columns C2-C5 and row R1 of FIG. 4. It has been observed that in most implementations, gateway 110B also maintains the same mapping between the source port 330 and the new source port 331 (shown in FIG. 3) for the now resumed TCP session as for the TCP session prior to disassociation of STA 120 from AP 110A. Hence, it is assumed herein that gateway 110B maintains such same mapping (i.e., consistently maps a given pair of source IP address and source port to the same new source port) when recreating the entries in columns C2-C5 and row R1 noted above.

Server 180, upon receipt of packet 530 transmits an acknowledgement packet 540 at t55 to STA 120. The receipt of the acknowledgement packet at gateway 110B causes gateway 110B to retain permanently the created NAT table entries, until they are deleted following end of the TCP session or another disassociation of STA 120 from AP 110A. Thus, the SYN bit set to one 'tricks' gateway 110B into creating the NAT table entries for STA 120 for the (now resumed) TCP session.

The NAT table entries having thus been created, STA 120 and server 180 may exchange further packets 550. The TCP session may be terminated 560 by exchange of packets 561, 562, 563 and 564 in a manner similar to that described with respect to FIG. 4. It is noted that the technique noted above requires design changes to be made only in STA 120, and does not require design changes to be made in device 110 or server 180.

In an alternative embodiment of the present disclosure, packet 530 instead of containing no data in data field 630, contains valid data in data field 630, with the rest of the fields IP header 610 and TCP header 620 containing identical entries as described above. The data in field 630 may start with a data byte which is the next data byte to the last data byte transmitted by STA 120 to server 180 in the TCP session before disassociation. It is noted that server 180 may not by default be designed to accept packet 530 in such an alternative embodiment, since servers are typically designed to accept data only in TCP packets that do not have the SYN bit set.

Therefore, in the alternative embodiment, server 180 is designed to respond to receipt of packet 530 with an acknowledgement packet. The receipt at gateway 110B of packet 530 causes gateway 110B to create NAT table entries for the TCP session, with the acknowledgment from server 180 causing gateway 110B to preserve the entries (till such time as they are needed), Thereafter, STA 120 and server 180 may exchange data packets. It is noted that the technique of the alternative embodiment requires changes to be made in STA 120 as well as server 180, and does not require changes to be made in device 110 (i.e., in AP 110A or gateway 110B). In this alternative embodiment, it is required that STA 120 be assigned the same local source IP address as that before disassociation.

6. Other Embodiments

In yet another embodiment of the present disclosure, upon re-association after having been disassociated from AP 110A, STA 120 is designed to transmit a frame to AP 110A, with the packet expressly (i.e., by appropriate values for data bits according to pre-specified convention) requesting AP 110A to re-create NAT table entries for the not-yet terminated TCP session. Thus, STA 120 may transmit the entries (e.g., the entries of column C2 and C4) in a frame (which may be a new proprietary WLAN frame type) to AP 110A, which then creates the entries such as that shown in FIG. 4. STA 120 may thereafter exchange packets with server 180 on the same TCP session, while also using the correct sequence numbers (i.e., not fresh numbers, but resuming from the last sequence number prior to disassociation). In this embodiment also, it is required that STA 120 be re-assigned the same local source IP address as that before disassociation. The technique of this embodiment requires design changes to be made in both STA 120 and AP 110A.

In yet another embodiment of the present disclosure, even after disassociation of STA 120 from AP 110A, AP 110A is designed to retain the local IP address of STA 120 for a predetermined duration (T) following disassociation of STA 120, and does not assign STA 120's local IP address to any other device in duration T. The length of duration T can be any value, and is a duration in the range one minute to ten minutes in an embodiment. Gateway 110B is also designed not to delete the existing NAT table entries for the TCP session(s) of STA 120 for the duration T following disassociation of STA 120 from AP 110A.

Thus, if STA 120 is able to re-associate with AP 110A within the duration T from the instant of disassociation, STA 120 can resume data exchange with server 180 on the interrupted TCP session (while also continuing the sequence numbers from the last sequence number prior to disassociation) in TCP header fields of packets transmitted to since the NAT table entries for the TCP session(s) are still available in gateway 110B. It is noted that this technique requires design changes only in device 110, i.e., in AP 110A and gateway 110B, and no design changes are required in STA 120 or server 180.

The block-level implementation details of STA 120 in an embodiment are described next.

7. Wireless Station

Figure 7:
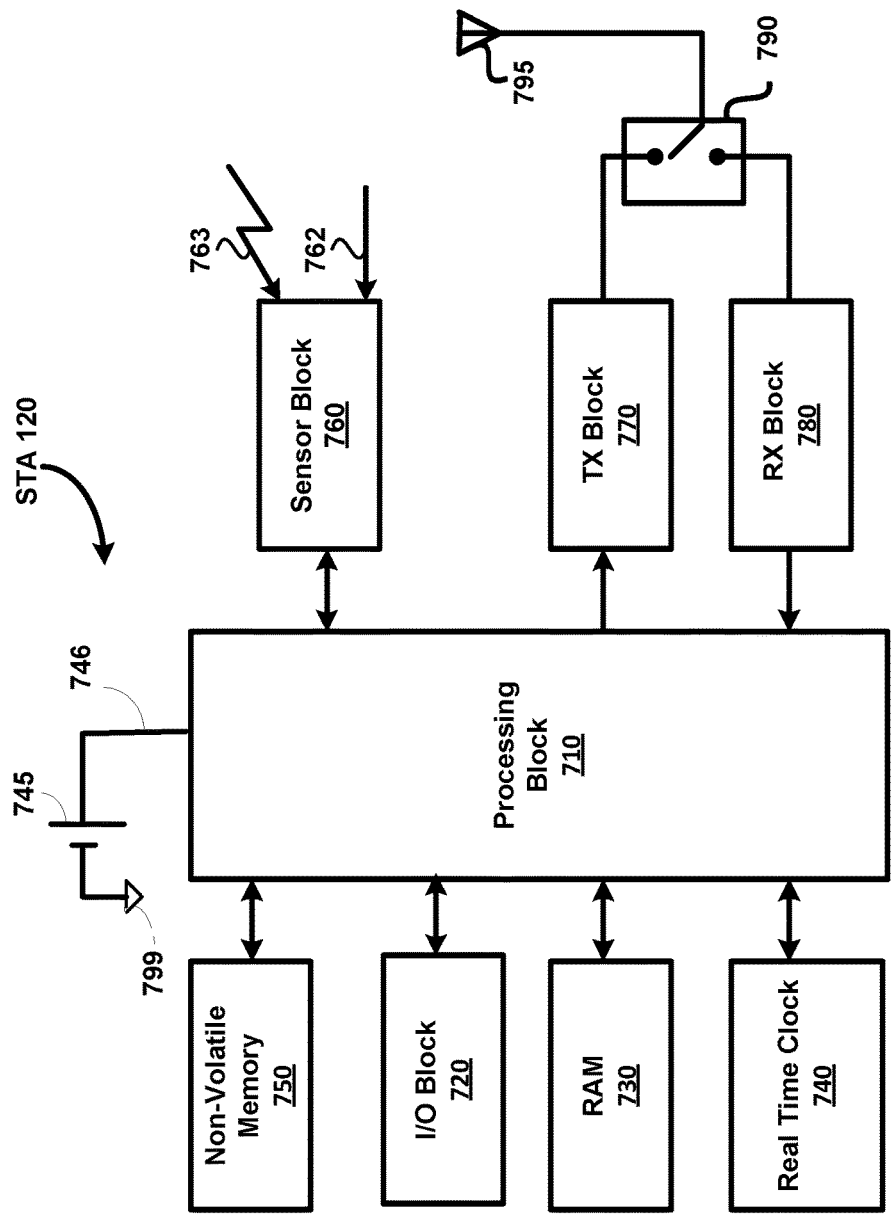
FIG. 7 is a block diagram showing the implementation details of a STA in an embodiment of the present disclosure.

FIG. 7 is a block diagram showing the implementation details of a STA in an embodiment of the present disclosure.

STA 120 is shown containing processing block 710, input/output (I/O) block 720, random access memory (RAM) 730, real-time clock (RTC) 740, battery 745, non-volatile memory 750, sensor block 760, transmit (TX) block 770, receive (RX) block 780, switch 790, and antenna 795. The whole of STA 120 may be implemented as a system-on-chip (SoC), except for battery 745 and antenna 795. Alternatively, the blocks of FIG. 7 may be implemented on separate integrated circuits (IC). Terminal 799 represents a ground terminal. STAs 130 may also be implemented as shown in FIG. 7, and as described below.

Battery 745 provides power for operation of STA 120, and may be connected to the various blocks shown in FIG. 7. While STA 120 is shown as being battery-powered, in another embodiment, STA 120 is mains-powered and contains corresponding components such as transformers, regulators, power filters, etc. RTC 740 operates as a clock, and provides the 'current' time to processing block 710. Additionally, RTC 740 may internally contain one or more timers.

I/O block 720 provides interfaces for user interaction with STA 120, and includes input devices and output devices. The input devices may include a keyboard and a pointing device (e.g., touch-pad, mouse). Output devices may include a display.

Sensor block 760 may contain one or more sensors, as well as corresponding signal conditioning circuitry, and provides to processing block 710, measurements/values of physical quantities such as temperature, pressure, etc., sensed via wired path 762 or wireless path 763. Sensor block 760 may perform analog-to-digital conversion of the measurement/values prior to forwarding the measurements/values to processing block 710. One or more applications executing in STA 120 may further process the (digitized) measurements/values and form frames/packets containing such values.

Antenna 795 may corresponds to antenna 125 of FIG. 1, and operates to receive from, and transmit to, a wireless medium, corresponding wireless signals (including frames and IP packets), for example, according to IEEE 802.11 (WLAN) standards). Switch 790 may be controlled by processing block 710 (connection not shown) to connect antenna 795 to one of blocks 770 and 780 as desired, depending on whether transmission or reception of wireless signals is required. Switch 790, antenna 795 and the corresponding connections of FIG. 7 are shown merely by way of illustration. Instead of a single antenna 795, separate antennas, one for transmission and another for reception of wireless signals, can also be used.

TX block 770 receives, from processing block 710, frames and/or IP packets to be transmitted on a wireless medium (e.g., according to a wireless standard such as IEEE 802.11), generates a modulated radio frequency (RF) signal (according to the standard), and transmits the RF signal via switch 790 and antenna 795. TX block 770 may contain RF and baseband circuitry for generating and transmitting wireless signals, as well as for medium access operations. Alternatively, TX block 770 may contain only the RF circuitry, with processing block 710 performing the baseband and medium access operations (in conjunction with the RF circuitry).

RX block 780 represents a receiver that receives a wireless (RF) signal (e.g., according to IEEE 802.11 standards) bearing data (frames and/or IP packets) and/or control information via switch 790, and antenna 795, demodulates the RF signal, and provides the extracted data or control information to processing block 710. RX block 780 may contain RF as well as baseband processing circuitry for processing a WLAN signal. Alternatively, RX block 780 may contain only the RF circuitry, with processing block 710 performing the baseband operations in conjunction with the RF circuitry.

Non-volatile memory 750 is a non-transitory machine readable medium, and stores instructions, which when executed by processing block 710, causes STA 120 to operate as described above. In particular, the instructions enable STA 120 to operate as described with respect to the flowchart of FIG. 2. Further, nonvolatile memory 750 may store instructions corresponding to applications to be executed in STA 120. The instructions may either be executed directly from non-volatile memory 750 or be copied to RAM 730 for execution.

RAM 730 is a volatile random access memory, and may be used for storing instructions and data.

RAM 730 and non-volatile memory 750 (which may be implemented in the form of read-only memory/ROM/Flash) constitute computer program products or machine (or computer) readable medium, which are means for providing instructions to processing block 710. Processing block 710 may retrieve the instructions, and execute the instructions to provide several features of the present disclosure.

Processing block 710 (or processor in general) may contain multiple processing units internally, with each processing unit potentially being designed for a specific task. Alternatively, processing block 710 may contain only a single general-purpose processing unit. Processing block 710 executes instructions stored in non-volatile memory 750 or RAM 730 to enable STA 120 to operate according to several aspects of the present disclosure, described above in detail.

8. Conclusion

References throughout this specification to "one embodiment", "an embodiment", or similar language means that a particular feature, structure, or characteristic described in connection with the embodiment is included in at least one embodiment of the present invention. Thus, appearances of the phrases "in one embodiment", "in an embodiment" and similar language throughout this specification may, but do not necessarily, all refer to the same embodiment.

While various embodiments of the present invention have been described above, it should be understood that they have been presented by way of example only, and not limitation. Thus, the breadth and scope of the present invention should not be limited by any of the above-described embodiments, but should be defined only in accordance with the following claims and their equivalents.

What is claimed is:

1. A method comprising:
    associating, by a wireless station, with an access point to join a wireless local area network (WLAN), said access point being part of said WLAN and operating as a switching device between wireless stations of said WLAN;
    forming, by said wireless station, a TCP session via said access point with an external device which is external to said WLAN;
    exchanging, by said wireless station, a first sequence of packets on said TCP session;
    receiving, by said wireless station, a frame from said access point, wherein said frame indicates that said wireless station has been disassociated after said associating;
    re-associating, by said wireless station, with said access point after having been disassociated; and
    communicating, by said wireless station, with said external device on said same TCP session before and after said re-associating, wherein said communicating comprises exchanging a second sequence of packets after said re-associating.

2. The method of claim 1, wherein each of said WLAN and said external device is part of an internet protocol (IP) network implemented according to IP version 4 (IPv4), wherein an IP address of each device in said IP network is assigned thirty two bytes only,
    wherein said WLAN is assigned only a single global IP address, said wireless station being assigned a local IP address within said WLAN, wherein said local IP address is different from said global IP address.

3. The method of claim 2, wherein said access point is also a gateway, wherein said gateway performs network address translation (NAT) to:
    replace said local IP address in a source IP address field of each TCP/IP packet of said TCP session transmitted by said wireless station to said server by said global IP address of said WLAN, and
    replace said global IP address of said WLAN in a destination IP address field of each TCP/IP packet of said TCP session transmitted by said server to said wireless station by said local IP address of said wireless station,
    wherein said gateway maintains a NAT table containing entries for said wireless station corresponding to said TCP session, wherein said gateway deletes said entries upon disassociation of said wireless station from said access point.

4. The method of claim 3, wherein said wireless station maintains a sequence number associated with said TCP session, wherein said sequence number represents a number of bytes that have so far been transmitted on said TCP session, wherein said sequence number is continued on said TCP session after said re-association.

5. The method of claim 4, wherein after said re-associating and prior to said communicating, said wireless station transmits to said server, a first TCP/IP packet, wherein the SYN flag in the TCP header of said first TCP/IP packet is set to one,
    wherein receipt at said gateway of said first TCP/IP packet causes said gateway to re-create said entries for said TCP session, whereby said wireless station is enabled to perform said communicating.

6. The method of claim 5, wherein said first TCP/IP packet contains no data, and wherein the ACK flag in said TCP header is zero.

7. The method of claim 5, wherein said first TCP/IP packet contains data, and wherein the ACK flag in said TCP header is zero.

8. The method of claim 4, wherein said wireless station expressly requests said gateway to re-create said entries after said re-association.

9. The method of claim 4, wherein said gateway is designed to maintain said entries for a pre-determined duration of time after disassociation of said wireless device from said AP, and
    wherein said AP refrains from allocating said local IP address to another device in said WLAN for a duration equal to said pre-determined duration.

10. A wireless station comprising:
    a processing block and a memory,
    said memory to store instructions which when retrieved and executed by said processing block causes said wireless device to perform the actions of:
        associating with an access point to join a wireless local area network (WLAN), said access point being part of said WLAN and operating as a switching device between wireless stations of said WLAN;

forming a TCP session via said access point with an external device which is external to said WLAN;

exchanging a first sequence of packets on said TCP session;

receiving a frame from said access point, wherein said frame indicates that said wireless station has been disassociated after said associating;

re-associating with said access point after having been disassociated;

communicating with said external device on said same TCP session before and after said re-associating, wherein said communicating comprises exchanging a second sequence of packets after said re-associating.

11. The wireless station of claim 10, wherein each of said WLAN and said external device is part of an internet protocol (IP) network implemented according to IP version 4 (IPv4), wherein an IP address of each device in said IP network is assigned thirty two bytes only, wherein said WLAN is assigned only a single global IP address, said wireless station being assigned a local IP address within said WLAN, wherein said local IP address is different from said global IP address.

12. The wireless station of claim 11, wherein said access point is also a gateway, wherein said gateway performs network address translation (NAT) to:

replace said local IP address in a source IP address field of each TCP/IP packet of said TCP session transmitted by said wireless station to said server by said global IP address of said WLAN, and replace said global IP address of said WLAN in a destination IP address field of each TCP/IP packet of said TCP session transmitted by said server to said wireless station by said local IP address of said wireless station, wherein said gateway maintains a NAT table containing entries for said wireless station corresponding to said TCP session, wherein said gateway deletes said entries upon disassociation of said wireless station from said access point.

13. The wireless station of claim 12, wherein said wireless station maintains a sequence number associated with said TCP session, wherein said sequence number represents a number of bytes that have so far been transmitted on said TCP session.

14. The wireless station of claim 13, wherein after said re-associating and prior to said communicating, said wireless station transmits to said server, a first TCP/IP packet, wherein the SYN flag in the TCP header of said first TCP/IP packet is set to one, wherein receipt at said gateway of said first TCP/IP packet causes said gateway to re-create said entries for said TCP session, whereby said wireless station is enabled to perform said communicating.

15. The wireless station of claim 14, wherein said first TCP/IP packet contains no data, and wherein the ACK flag in said TCP header is zero.

16. A non-transitory machine readable medium storing one or more sequences of instructions for operating a wireless station, wherein execution of said one or more instructions by one or more processors contained in said wireless station enables said wireless device to perform the actions of:

associating with an access point to join a wireless local area network (WLAN), said access point being part of said WLAN and operating as a switching device between wireless stations of said WLAN;

forming a TCP session via said access point with an external device which is external to said WLAN;

exchanging a first sequence of packets on said TCP session;

receiving a frame from said access point, wherein said frame indicates that said wireless station has been disassociated after said associating;

re-associating with said access point after having been disassociated;

communicating with said external device on said same TCP session before and after said re-associating, wherein said communicating comprises exchanging a second sequence of packets after said re-associating.

17. The non-transitory machine readable medium of claim 16, wherein each of said WLAN and said external device is part of an internet protocol (IP) network implemented according to IP version 4 (IPv4), wherein an IP address of each device in said IP network is assigned thirty two bytes only, wherein said WLAN is assigned only a single global IP address, said wireless station being assigned a local IP address within said WLAN, wherein said local IP address is different from said global IP address.

18. The non-transitory machine readable medium of claim 17, wherein said access point is also a gateway, wherein said gateway performs network address translation (NAT) to:

replace said local IP address in a source IP address field of each TCP/IP packet of said TCP session transmitted by said wireless station to said server by said global IP address of said WLAN, and replace said global IP address of said WLAN in a destination IP address field of each TCP/IP packet of said TCP session transmitted by said server to said wireless station by said local IP address of said wireless station, wherein said gateway maintains a NAT table containing entries for said wireless station corresponding to said TCP session, wherein said gateway deletes said entries upon disassociation of said wireless station from said access point.

19. The non-transitory machine readable medium of claim 18, wherein said wireless station maintains a sequence number associated with said TCP session, wherein said sequence number represents a number of bytes that have so far been transmitted on said TCP session.

* * * * *